United States Patent
Yanagihara

(10) Patent No.: US 10,159,032 B2
(45) Date of Patent: Dec. 18, 2018

(54) WIRELESS COMMUNICATION DEVICE, METHOD, AND SYSTEM

(71) Applicant: Oki Electric Industry Co., Ltd., Tokyo (JP)

(72) Inventor: Kentarou Yanagihara, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 224 days.

(21) Appl. No.: 15/179,697

(22) Filed: Jun. 10, 2016

(65) Prior Publication Data
US 2017/0063662 A1 Mar. 2, 2017

(30) Foreign Application Priority Data
Aug. 31, 2015 (JP) .................................. 2015-170541

(51) Int. Cl.
*H04J 3/14* (2006.01)
*H04L 12/28* (2006.01)
(Continued)

(52) U.S. Cl.
CPC ....... *H04W 40/248* (2013.01); *H04W 40/246* (2013.01); *H04W 84/12* (2013.01)

(58) Field of Classification Search
CPC ...... H04W 84/18; H04W 8/005; H04L 45/26; H04L 45/16; H04L 45/22; H04L 45/745
See application file for complete search history.

(56) References Cited

U.S. PATENT DOCUMENTS 7,835,301 B1 * 11/2010 Maufer ................. H04W 24/02
370/254
2003/0007461 A1 * 1/2003 Chen ................. H04L 29/12254
370/254
(Continued)

FOREIGN PATENT DOCUMENTS

JP 2008-182409 A 8/2008

*Primary Examiner* — Charles C Jiang
*Assistant Examiner* — Will W Lin
(74) *Attorney, Agent, or Firm* — Rabin & Berdo, P.C.

(57) ABSTRACT

Provided is a wireless communication device that mutually exchanges at least a notification signal including its own identification code and an identification code of a surrounding wireless communication device with the surrounding wireless communication device, the wireless communication device including: a transmission unit for periodically transmitting the notification signal; a reception unit for receiving the notification signal; a recording/updating unit for recording/updating surrounding-wireless-communication-device information of each of surrounding wireless communication devices when the reception unit has received the notification signal, the surrounding-wireless-communication-device information including an identification code of a wireless communication device at a transmission side and an identification code of a surrounding wireless communication device around the wireless communication device at the transmission side that are included in the notification signal; and an abnormality detecting unit for detecting abnormality of the surrounding wireless communication device from the surrounding-wireless-communication-device information recorded in the recording/updating unit.

9 Claims, 8 Drawing Sheets

(51) Int. Cl.
*H04W 40/24* (2009.01)
*H04J 3/16* (2006.01)
*H04W 84/12* (2009.01)

(56) References Cited

U.S. PATENT DOCUMENTS

| | | | | |
|---|---|---|---|---|
| 2006/0039371 | A1* | 2/2006 | Castro | H04L 12/42 370/389 |
| 2008/0062862 | A1* | 3/2008 | Goyal | H04L 45/00 370/218 |
| 2008/0183853 | A1* | 7/2008 | Manion | H04L 12/4641 709/223 |
| 2008/0247408 | A1* | 10/2008 | Yoon | H04L 1/1657 370/408 |
| 2009/0109870 | A1* | 4/2009 | Metke | H04L 45/46 370/254 |
| 2009/0262642 | A1* | 10/2009 | van Greunen | H04L 41/00 370/216 |
| 2010/0260071 | A1* | 10/2010 | Lai | H04L 45/22 370/256 |
| 2011/0022725 | A1* | 1/2011 | Farkas | H04L 45/00 709/238 |
| 2011/0149844 | A1* | 6/2011 | G. | H04L 45/122 370/328 |
| 2013/0288645 | A1* | 10/2013 | Zheng | H04W 72/0446 455/411 |
| 2014/0185499 | A1* | 7/2014 | Ray | H04W 84/18 370/310 |
| 2015/0222479 | A1* | 8/2015 | Kim | H04W 28/0236 370/218 |
| 2015/0289191 | A1* | 10/2015 | Wang | H04W 76/14 455/445 |

\* cited by examiner

FIG. 3

| NO | TRANSMISSION TERMINAL NUMBER | OWN ADDRESS | SURROUNDING TERMINAL LIST |
|---|---|---|---|
| 1 | 100 | 100 | 101, 103, 104 |
| 2 | 101 | 101 | 101, 102, 103, 104, 105 |
| 3 | 102 | 102 | 101, 104, 105 |
| 4 | 103 | 103 | 100, 101, 104, 106, 107 |
| 5 | 104 | 104 | 100, 101, 102, 103, 105, 106, 107, 108 |
| 6 | 105 | 105 | 101, 102, 104, 107, 108 |
| 7 | 106 | 106 | 103, 104, 107 |
| 8 | 107 | 107 | 103, 104, 105, 106, 108 |
| 9 | 108 | 108 | 104, 105, 107 |

FIG. 4

| NO | TERMINAL NUMBER | TYPE | SURROUNDING TERMINAL LIST | | | | | | | |
|---|---|---|---|---|---|---|---|---|---|---|
| 1 | 100 | ADJACENCY | 101 | 103 | 104 | --- | --- | --- | --- | --- |
|   |   | SECONDARY ADJACENCY | 100, 102, 103, 104, 105 | 100, 101, 104, 106, 107 | 100, 101, 102, 103, 105, 106, 107, 108 | --- | --- | --- | --- | --- |
| 2 | 101 | ADJACENCY | 100 | 102 | 103 | --- | --- | --- | --- | --- |
|   |   | SECONDARY ADJACENCY | 101, 103, 104 | 101, 104, 105 | 100, 101, 102, 104, 105, 106, 107, 108 | 104 | --- | --- | --- | --- |
| 3 | 102 | ADJACENCY | 101 | 104 | 105 | --- | --- | --- | --- | --- |
|   |   | SECONDARY ADJACENCY | 100, 102, 103, 104, 105 | 100, 101, 102, 103, 105, 106, 107, 108 | 101, 102, 104, 108 | --- | --- | --- | --- | --- |
| 4 | 103 | ADJACENCY | 100 | 101 | 104 | 106 | --- | --- | --- | --- |
|   |   | SECONDARY ADJACENCY | 101, 103, 104 | 100, 102, 103, 104, 105 | 100, 101, 102, 103, 105, 106, 107, 108 | 107 | 103, 104, 105, 108 | --- | --- | --- |
| 5 | 104 | ADJACENCY | 100 | 101 | 102 | 103 | 105 | 106 | 107 | 108 |
|   |   | SECONDARY ADJACENCY | 101, 103, 104 | 100, 102, 103, 104, 105 | 101, 104, 105 | 100, 101, 102, 103, 105, 106, 107, 108 | 102, 104, 108 | 103, 104, 107 | 103, 104, 105, 108 | 104, 105, 107 |
| 6 | 105 | ADJACENCY | 101 | 102 | 104 | 107 | 108 | --- | --- | --- |
|   |   | SECONDARY ADJACENCY | 100, 102, 103, 104, 105 | 101, 104, 105 | 100, 101, 102, 103, 105, 106, 107, 108 | 108 | 104, 105, 107 | --- | --- | --- |
| 7 | 106 | ADJACENCY | 103 | 104 | 107 | --- | --- | --- | --- | --- |
|   |   | SECONDARY ADJACENCY | 100, 101, 104, 106, 107 | 100, 101, 102, 103, 105, 106, 107, 108 | 103, 104, 105, 106, 108 | 106 | --- | --- | --- | --- |
| 8 | 107 | ADJACENCY | 103 | 104 | 105 | 106 | 108 | --- | --- | --- |
|   |   | SECONDARY ADJACENCY | 100, 101, 102, 103, 106, 107 | 100, 101, 102, 103, 105, 106, 107, 108 | 101, 102, 104, 108 | 103, 104, 107 | 104, 105, 107 | --- | --- | --- |
| 9 | 108 | ADJACENCY | 104 | 105 | 107 | --- | --- | --- | --- | --- |
|   |   | SECONDARY ADJACENCY | 100, 101, 102, 103, 105, 106, 107, 108 | 101, 102, 104, 107, 108 | 103, 104, 105, 106, 108 | --- | --- | --- | --- | --- |

FIG. 5

| NO | TERMINAL NUMBER | ADJACENCY | FINAL RECEPTION TIME | DETERMINATION |
|---|---|---|---|---|
| 1 | 101 | DIRECT | 2014/01/01 00:00:01 | ◯ |
| 2 | 101 | 103 | 2014/01/01 00:00:03 | ◯ |
| 3 | 101 | 104 | 2014/01/01 00:00:04 | ◯ |
| 4 | 102 | 101 | 2014/01/01 00:00:01 | ◯ |
| 5 | 102 | 104 | 2014/01/01 00:00:04 | ◯ |
| 6 | 103 | DIRECT | 2014/01/01 00:00:03 | ◯ |
| 7 | 103 | 101 | 2014/01/01 00:00:01 | ◯ |
| 8 | 103 | 104 | 2014/01/01 00:00:04 | ◯ |
| 9 | 104 | DIRECT | 2014/01/01 00:00:04 | ◯ |
| 10 | 104 | 101 | 2014/01/01 00:00:01 | ◯ |
| 11 | 104 | 103 | 2014/01/01 00:00:03 | ◯ |
| 12 | 105 | 101 | 2014/01/01 00:00:01 | ◯ |
| 13 | 105 | 104 | 2014/01/01 00:00:04 | ◯ |
| 14 | 106 | 103 | 2014/01/01 00:00:03 | ◯ |
| 15 | 106 | 104 | 2014/01/01 00:00:04 | ◯ |
| 16 | 107 | 103 | 2014/01/01 00:00:03 | ◯ |
| 17 | 107 | 104 | 2014/01/01 00:00:04 | ◯ |
| 18 | 108 | 104 | 2014/01/01 00:00:04 | ◯ |

FIG. 6

| NO | TERMINAL NUMBER | ADJACENCY | FINAL RECEPTION TIME | DETERMINATION |
|---|---|---|---|---|
| 1 | 101 | DIRECT | 2014/01/01 00:09:01 | ○ |
| 2 | 101 | 103 | 2014/01/01 00:09:03 | ○ |
| 3 | 101 | 104 | 2014/01/01 00:09:04 | ○ |
| 4 | 102 | 101 | 2014/01/01 00:09:01 | ○ |
| 5 | 102 | 104 | 2014/01/01 00:09:04 | ○ |
| 6 | 103 | DIRECT | 2014/01/01 00:09:03 | ○ |
| 7 | 103 | 101 | 2014/01/01 00:09:01 | ○ |
| 8 | 103 | 104 | 2014/01/01 00:09:04 | ○ |
| 9 | 104 | DIRECT | 2014/01/01 00:09:04 | ○ |
| 10 | 104 | 101 | 2014/01/01 00:09:01 | ○ |
| 11 | 104 | 103 | 2014/01/01 00:09:03 | ○ |
| 12 | 105 | 101 | 2014/01/01 00:09:01 | × |
| 13 | 105 | 104 | 2014/01/01 00:09:04 | × |
| 14 | 106 | 103 | 2014/01/01 00:09:03 | ○ |
| 15 | 106 | 104 | 2014/01/01 00:09:04 | ○ |
| 16 | 107 | 103 | 2014/01/01 00:09:03 | ○ |
| 17 | 107 | 104 | 2014/01/01 00:09:04 | ○ |
| 18 | 108 | 104 | 2014/01/01 00:09:04 | ○ |

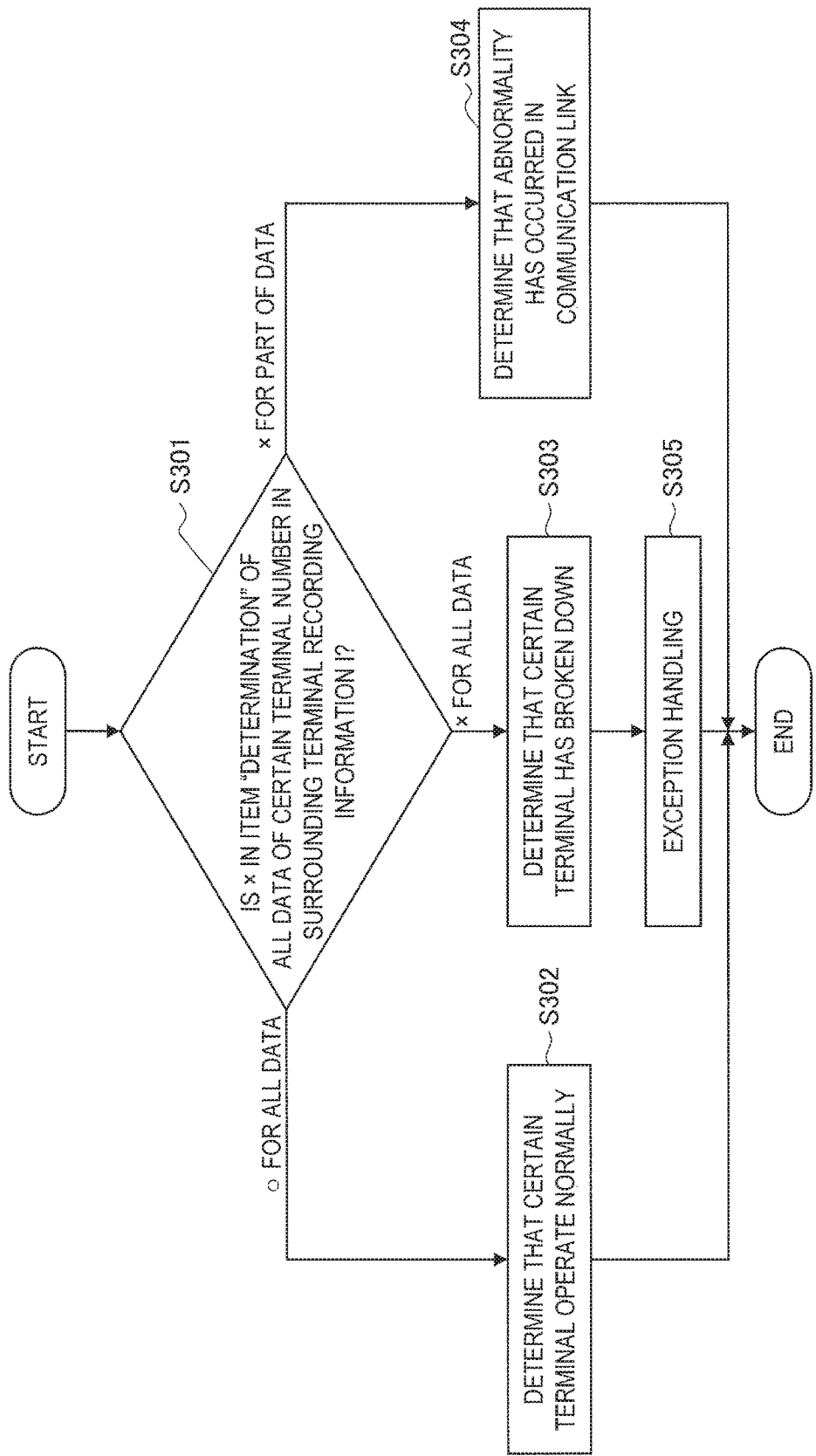

ional Application No. 2015-170541,

WIRELESS COMMUNICATION DEVICE, METHOD, AND SYSTEM

CROSS REFERENCE TO RELATED APPLICATION(S)

This application is based upon and claims benefit of priority from Japanese Patent Application No. 2015-170541, filed on Aug. 31, 2015, the entire contents of which are incorporated herein by reference.

BACKGROUND

The present invention relates to a wireless communication device, method, and system. For example, the present invention may be applied to a short range wireless network such as a sensor network.

In the short range wireless network such as the sensor network, sometimes a wireless terminal constituting the wireless network is often added or deleted. In addition, since there are many wireless terminals, it is highly possible that some wireless terminal breaks down.

Therefore, the wireless terminal has to perform routing while constantly recognizing breakdowns of surrounding wireless terminals serving as transmission destinations. Accordingly, various kinds of method for recognizing a breakdown state of a wireless terminal in a wireless network environment have been proposed.

For example, JP 2008-182409A1 proposes a method for suspecting a breakdown because packets (existence notification message in JP 2008-182409A1) periodically exchanged between wireless terminals have not been received, transmitting a diagnosis message to a suspected terminal via various kinds of paths, and detecting the breakdown from a response from the terminal.

SUMMARY

However, reasons why the packets have not reached the wireless terminal serving as a transmission destination in the wireless network environment include various kinds of reasons (for example, temporal disruption of a wireless link, collision of packets, transmission failure under transmission control, and reception failure due to bit error) in addition to the breakdown of the wireless terminal itself.

An incidence of such a reason (event) is generically higher than that of the breakdown of the wireless terminal itself. In the case of a breakdown detection unit using a diagnosis message like JP 2008-182409A1, the number of the breakdown diagnosis increases (the number of diagnosis messages in the network increases) with occurrence of the event, and it is believed that this has a bad effect on performance of the wireless network (for example, squeeze into band in the wireless network).

Therefore, a wireless communication device, method, and system capable of effectively detecting abnormality of the wireless communication device without the bad effect on performance of the wireless network have been desired.

According to a first aspect of the present invention, a wireless communication device mutually exchanges at least a notification signal including its own identification code and an identification code of a surrounding wireless communication device with the surrounding wireless communication device, the wireless communication device including: (1) a transmission unit for periodically transmitting the notification signal; (2) a reception unit for receiving the notification signal; (3) a recording/updating unit for recording/updating surrounding-wireless-communication-device information of each of surrounding wireless communication devices when the reception unit has received the notification signal, the surrounding-wireless-communication-device information including an identification code of a wireless communication device at a transmission side and an identification code of a surrounding wireless communication device around the wireless communication device at the transmission side that are included in the notification signal; and (4) an abnormality detecting unit for detecting abnormality of the surrounding wireless communication device from the surrounding-wireless-communication-device information recorded in the recording/updating unit.

According to a second aspect of the present invention, a wireless communication method of a wireless communication device mutually exchanges at least a notification signal including its own identification code and an identification code of a surrounding wireless communication device with the surrounding wireless communication device. A transmission unit, a reception unit, a recording/updating unit, and an abnormality detecting unit are included. (1) The transmission unit periodically transmits the notification signal. (2) The reception unit receives the notification signal. (3) The recording/updating unit records/updates surrounding-wireless-communication-device information of each of surrounding wireless communication devices when the reception unit has received the notification signal, the surrounding-wireless-communication-device information including an identification code of a wireless communication device at a transmission side and an identification code of a surrounding wireless communication device around the wireless communication device at the transmission side that are included in the notification signal. (4) The abnormality detecting unit detects abnormality of the surrounding wireless communication device from the surrounding-wireless-communication-device information recorded in the recording/updating unit.

According to a third aspect of the present invention, a program causes a computer mounted on a wireless communication device that mutually exchanges at least a notification signal including its own identification code and an identification code of a surrounding wireless communication device with the surrounding wireless communication device, to function as: (1) a transmission unit for periodically transmitting the notification signal; (2) a reception unit for receiving the notification signal; (3) a recording/updating unit for recording/updating surrounding-wireless-communication-device information of each of surrounding wireless communication devices when the reception unit has received the notification signal, the surrounding-wireless-communication-device information including an identification code of a wireless communication device at a transmission side and an identification code of a surrounding wireless communication device around the wireless communication device at the transmission side that are included in the notification signal; and (4) an abnormality detecting unit for detecting abnormality of the surrounding wireless communication device from the surrounding-wireless-communication-device information recorded in the recording/updating unit.

According to a fourth aspect of the present invention, a wireless communication system includes: a plurality of wireless communication devices; and a base station configured to manage the plurality of wireless communication devices. (1) The wireless communication device according to the first aspect of the present invention is applied to each of the plurality of wireless communication devices. (2) The wireless communication device further includes an abnormality-notification-signal transmitting unit configured to transmit an abnormality notification signal indicating that abnormality has been detected to the base station in a case where the abnormality detecting unit has detected the abnormality of a specific wireless communication device.

According to the present invention, it is possible to effectively detect abnormality of a wireless communication device without a bad effect on performance of a wireless network.

BRIEF DESCRIPTION OF THE DRAWINGS

FIG. 3 is an explanatory diagram illustrating examples of HELLO packets transmitted by a base station and wireless terminals according to the present embodiment;

FIG. 4 is an explanatory diagram illustrating information recorded in a HELLO packet recording unit according to the present embodiment;

FIG. 5 is an explanatory diagram 1 illustrating communication terminal determination recording information held by a surrounding terminal management unit 208 according to the present embodiment;

FIG. 6 is an explanatory diagram 2 illustrating communication terminal determination recording information held by the surrounding terminal management unit 208 according to the present embodiment;

FIG. 9 is a flowchart illustrating operation of a surrounding terminal management unit according to the present embodiment to detect a breakdown of a surrounding terminal from communication terminal determination recording information.

DETAILED DESCRIPTION OF THE EMBODIMENT(S)

Figure 1:
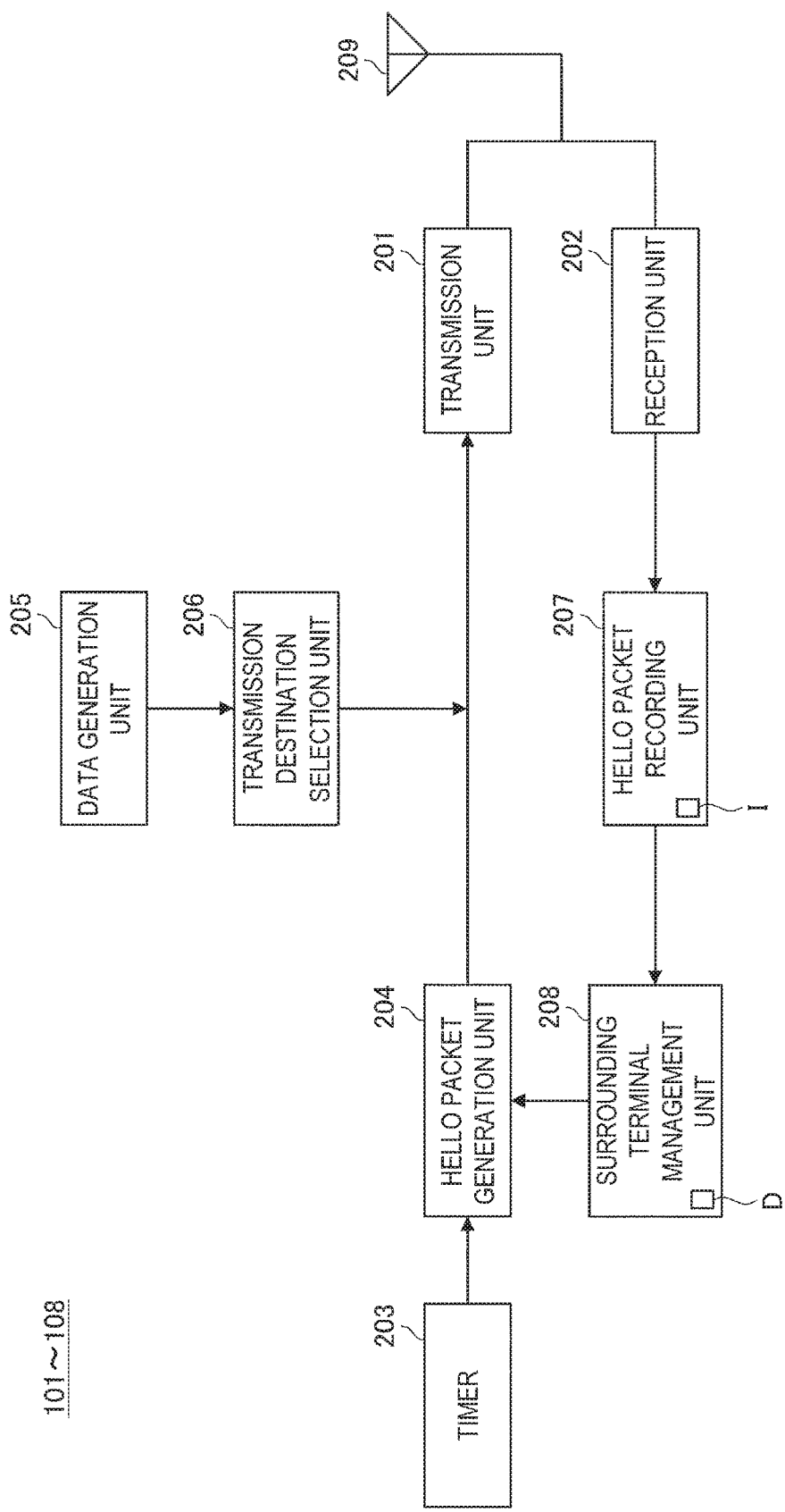
FIG. 1 is a block diagram illustrating a configuration of a wireless terminal according to the present embodiment.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

(A) Main Embodiment

Hereinafter, details of an embodiment of the wireless communication device, method, program, and system according to the present invention are described with reference to drawings.
(A-1) Configuration in Embodiment FIG. 2 is a block diagram illustrating an entire configuration of a wireless communication network according to this embodiment.

Figure 2:
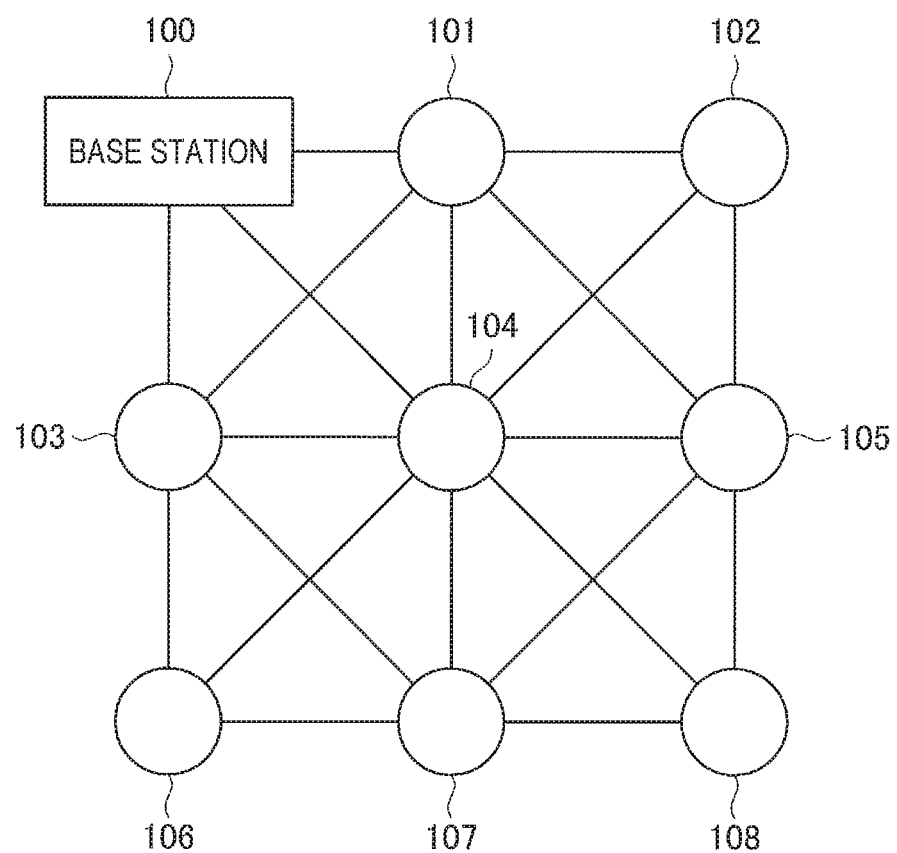
FIG. 2 is a block diagram illustrating an entire configuration of a wireless communication network according to the present embodiment.

To simplify the description, FIG. 2 illustrates an example in which a wireless communication network 1 includes a base station 100 and eight wireless terminals 101 to 108. Of course, the number of the wireless terminals 10 is not specifically limited. Communication methods of the wireless terminals 101 to 108 are not specifically limited. For example, various kinds of wireless LAN interfaces may be applied. The base station 100 has a function of managing the entire wireless communication network 1. The base station 100 has all functions (to be described later) of the wireless terminals 101 to 108. In FIG. 2, straight lines connecting the base station 100 and eight wireless terminals 101 to 108 mean that the two terminals connected to each other (or the base station and the terminal connected to each other) are capable of directly communicating with each other.

FIG. 1 is a block diagram illustrating an internal configuration of the wireless terminal according to this embodiment. The wireless terminal according to the embodiment may be configured as hardware such as a dedicated IC chip equipped with respective structural elements illustrated in FIG. 1, or configured as software focused on a CPU and a program executed by the CPU. In both cases, the functional configuration can be illustrated in FIG. 1.

In FIG. 1, each of the wireless terminals 101 to 108 includes a transmission unit 201, a reception unit 202, a timer 203, a HELLO packet generation unit 204, a data generation unit 205, a transmission destination selection unit 206, a HELLO packet recording unit 207, and a surrounding terminal management unit 208.

An antenna 209 is an antenna for providing the reception unit 202 with acquired radio signals or radiating radio signals from the transmission unit 201 into space. Although FIG. 1 illustrates the case of the transmission and reception antenna, it is also possible to use a separate transmission antenna and reception antenna.

The reception unit 202 performs a demodulation process on the radio signals from the antenna 209, and converts the radio signals into digital data (reception data) to provide the HELLO packet recording unit 207 with the digital data. In this embodiment, the data that the wireless terminals 101 to 108 exchange with surrounding wireless terminals are at least two kinds of data including communication data and HELLO packets. The communication data is general data exchanged between terminals. The destination of the communication data is a specific wireless terminal like multicast. The HELLO packets are data periodically exchanged by the base station 100 and the respective wireless terminals 101 to 108, the data including information on surrounding terminals.

The HELLO packet recording unit 207 is a unit for extracting information on surrounding terminals from the received HELLO packets and recording the information.

The surrounding terminal management unit 208 is a unit for carrying out a process for estimating states of surrounding wireless terminals on the basis of the data recorded in the HELLO packet recording unit 207. Details of the process carried out by the surrounding terminal management unit 208 will be described in the following item regarding operation.

The timer 203 is a timer for periodically indicating time when the HELLO packet generation unit 204 generates HELLO packets.

The HELLO packet generation unit 204 is a unit for generating HELLO packets to be transmitted to the surrounding base station 100 and wireless terminals 101 to 108 (station or terminal connected via the straight line in FIG. 2), in response to the indication from the timer 203.

The data generation unit 205 is a unit for generating the communication data.

The transmission destination selection unit 206 is a unit for performing a process (routing) of a communication data selection destination.

The transmission unit 201 is a unit for converting the transmission data (communication data, HELLO packets) provided by the data generation unit 205 (transmission destination selection unit 206) or the HELLO packet generation unit into the radio signals and providing the antenna 209 with the radio signals.

(A-2) Operations in Embodiment

Next, operation of the wireless communication network 1 having the above described configuration in this embodiment will be described with reference to drawings. In the following description, each of the base station 100 and the wireless terminals 101 to 108 (hereinafter, also simply referred to as "terminal") has a unique address (for example, IP address) by which the base station or the terminal can be identified in the wireless communication network 1. Hereinafter, to simplify the description, it is assumed that a reference sign of each terminal (terminals 100 to 108) and an address of the each terminal are the same.

Figure 7:
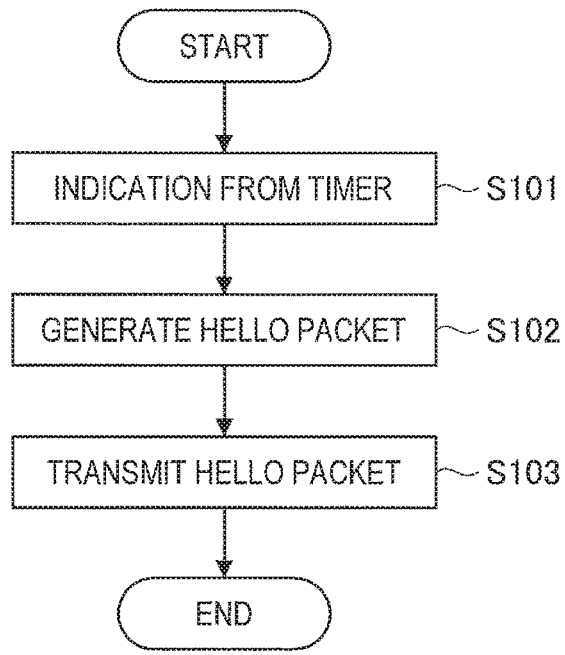
FIG. 7 is a flowchart illustrating HELLO packet transmission operation of a base station and wireless terminals according to the present embodiment.

FIG. 7 is a flowchart illustrating HELLO packet transmission operation of the base station and the wireless terminals.

The base station 100 and the wireless terminals 101 to 108 periodically transmit HELLO packets generated by the HELLO packet generation units 204 in response to the indication from the timers 203 (S101 to S103). The HELLO packets may be destined for individual surrounding terminals, or may be broadcasted (the HELLO packets are transmitted to all destinations, and all terminals capable of receiving the HELLO packets perform reception processes). Note that, in many cases, the HELLO packets are generally broadcasted so as to reduce communication traffic necessary for measurement. It is assumed that the HELLO packets to be transmitted include at least an address of itself, and a list (hereinafter, also referred to as "surrounding terminal list") of addresses of terminals (hereinafter, also referred to as "surrounding terminals") that each terminal recognizes as terminal around the each terminal. In addition, the HELLO packets may include a state of communication with the surrounding terminals, and information such as transmission intervals of the HELLO packets.

FIG. 3 is an explanatory diagram illustrating examples of the HELLO packets transmitted by the base station 100 and the wireless terminals 101 to 108. FIG. 3 illustrates items including "TRANSMISSION TERMINAL NUMBER" indicating terminals that transmits HELLO packets, "OWN ADDRESS" indicating an address of the transmission terminal, "SURROUNDING TERMINAL LIST" indicating terminals around the transmission terminal, and "NO" indicating numbers for identifying each piece of data.

FIG. 3 illustrates nine examples of the HELLO packets transmitted by each terminal. For example, a piece of data whose "NO" is 1 indicates that the terminal 100 (base station 100) has transmitted HELLO packets including information on its own address (100) and a surrounding terminal list (information on terminal 101, terminal 103, and terminal 104) to the terminals 101, 103, and 104 that are serving as the surrounding terminals. In addition, FIG. 3 illustrates the example in which the respective terminals exchange the HELLO packets normally in the wireless communication network 1 illustrated in FIG. 2.

Figure 8:
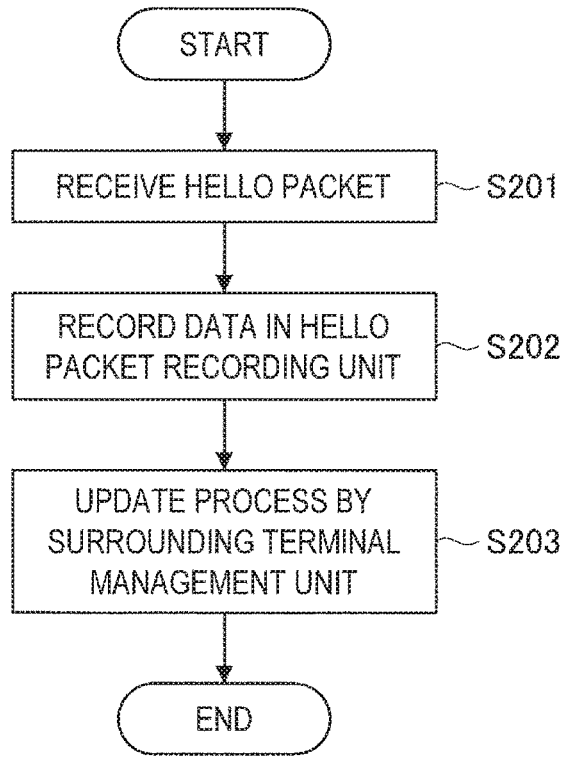
FIG. 8 is a flowchart illustrating HELLO packet reception operation of a base station and wireless terminals according to the present embodiment.

FIG. 8 is a flowchart illustrating HELLO packet reception operation of the base station and the wireless terminals.

Each terminal that has received the HELLO packets records data of the received HELLO packets in the HELLO packet recording unit 207 (S201 and S202). Subsequently, the surrounding terminal management unit 208 of the each terminal that has received the HELLO packets updates record of communication with each terminal (S203). According to the procedure in Step S202 and Step S203, the each terminal can acquire information on terminals (hereinafter, also referred to as "secondary surrounding terminal") around surrounding terminals at the same time when acquiring information on the surrounding terminals.

FIG. 4 is an explanatory diagram illustrating information (hereinafter, also referred to as "surrounding terminal recording information I") recorded in the HELLO packet recording units 207 of the base station 100 and the wireless terminals 101 to 108. FIG. 4 illustrates the surrounding terminal recording information I held by the respective terminals in the case where all the terminals normally exchange HELLO packets. FIG. 4 illustrates items including "NO" indicating numbers for identifying each piece of data (surrounding terminal recording information I) held by each terminal, "TERMINAL NUMBER" indicating terminals holding the surrounding terminal recording information I, "TYPE" of each surrounding terminal list ("ADJACENCY" indicates that the terminals are adjacent directly, and "SECONDARY ADJACENCY" indicates that the terminals are secondarily adjacent), and "SURROUNDING TERMINAL LIST" indicating terminals around the own terminal.

FIG. 4 illustrates nine examples of a piece of the surrounding terminal recording information I held by each terminal For example, a piece of data whose "NO" is 1 indicates a surrounding terminal list of the terminals 101, 103, and 104 that are adjacent to the terminal 100 (base station 100), a surrounding terminal list of terminals (100, 102, 103, 104, and 105) adjacent to the adjacent terminal 101, a surrounding terminal list of terminals (100, 101, 104, 106, and 107) adjacent to the adjacent terminal 103, and a surrounding terminal list of terminals (100, 101, 102, 103, 105, 106, 107, and 108) adjacent to the adjacent terminal 104.

At the time of normal communication, each of the terminals (100 to 108) holds any corresponding piece of data (surrounding terminal recording information I) of Nos. 1 to 9 in the HELLO packet recording unit 207.

FIG. 5 is an explanatory diagram illustrating communication terminal determination recording information D held by the surrounding terminal management unit 208 of the terminal 100 (base station 100). FIG. 5 illustrates items including "NO" indicating numbers for identifying each piece of data of the communication terminal determination recording information D held by the surrounding terminal management unit 208, "TERMINAL NUMBER" indicating an adjacent terminal, "ADJACENCY" indicating whether HELLO packets have been directly acquired from the adjacent terminal or indirectly acquired from a surrounding terminal list of another terminal (the word "DIRECT" is written in the case where the HELLO packets have been directly acquired, and the terminal number of the another terminal is written in the case where the HELLO packets have been indirectly acquired from the surrounding terminal list of the another terminal), "FINAL RECEPTION TIME" indicating time when the HELLO packets have been received, and "DETERMINATION" indicating success or failure of determination of reception of the HELLO packets (○ is written in the case where the HELLO packets including the surrounding terminal list are being normally received, and x is written in the case where the HELLO packets are not being received).

FIG. 5 illustrates the example in which the terminal 100 (base station 100) has received HELLO packets from the terminal 101 at 00:00:01 on 2014 Jan. 1, from the terminal 103 at 00:00:03 on 2014 Jan. 1, and from the terminal 104 at 00:00:04 on 2014 Jan. 1.

The surrounding terminal management unit 208 of the terminal 100 updates the communication terminal determination recording information D in FIG. 5 at every reception of HELLO packets from the terminal 101, terminal 102, or terminal 103. For example, the data of No. 1 is updated when the HELLO packets are directly received from the terminal 101 at 00:00:01 on 2014 Jan. 1. The data of No. 2 is updated when the HELLO packets are received from the terminal 103 at 00:00:03 on 2014 Jan. 1 because a surrounding terminal list in the received packets includes the terminal 101. The subsequent data also indicates the example in the case where all the terminals have normally exchanged HELLO packets. In other words, FIG. 3 indicates success or failure of exchange of HELLO packets in each communication path.

Under criteria for determination carried out by the surrounding terminal management unit 208, a determination result of appropriate data is x in the case where a certain period of time (for example, several times larger than HELLO packet transmission intervals) has elapsed from the final reception time, for example. This is because it is not reasonable to determine that the communication path is not available from first communication failure, since the failure occurs at a constant rate in the wireless communication. When transmitting the HELLO packets, the HELLO packet generation unit 204 generates the HELLO packets (process in Step S102 described above) after generating an adjacent terminal list including terminal numbers of terminals for which "DIRECT" is written in the item "ADJACENT" and ○ is written in the item "DETERMINATION" in the communication terminal determination recording information D (FIG. 5).

In summary, in the case of receiving no HELLO packet from the surrounding terminal for a certain period of time, each terminal determines that communication with the surrounding terminal has become unavailable (recognition of leaving) and deletes the surrounding terminal from the surrounding terminal list. Alternatively, in the case of receiving a signal from a terminal that is not in the surrounding terminal list, each of the terminals may add the new terminal to the surrounding terminal list (recognition of addition).

Next, details of operation in the surrounding terminal management unit 208 to detect a breakdown of a surrounding terminal from the communication terminal determination recording information D are described. First, in the case where a terminal leaves the wireless communication network 1, probable causes of this may include cut of wireless communication between the adjacent terminal and the own terminal due to any cause (for example, obstacle between them), and no HELLO packet transmission due to a breakdown of the adjacent terminal. The surrounding terminal management unit 208 distinguishes the both causes to detect (estimate) that the cause of the leaving is the breakdown in the terminal.

FIG. 9 is a flowchart illustrating operation of the surrounding terminal management unit 208 to detect a breakdown of a surrounding terminal from the communication terminal determination recording information D.

Every a certain period of time, the surrounding terminal management unit 208 examines a determination result of data for each terminal on the basis of the communication terminal determination recording information D (S301).

In the case where ○ has been obtained from the result of determination of all the data examined in Step S301, the surrounding terminal management unit 208 determines that the surrounding terminals operate normally and ends the process (S302).

In the case where x has been obtained from a part of the result of determination of the data examined in Step S301, the surrounding terminal management unit 208 determines that abnormality has occurred in a part of communication paths between the surrounding terminals and ends the process (S303).

In the case where x has been obtained from the result of determination of all the data examined in Step S301, the surrounding terminal management unit 208 determines that the surrounding terminal has broken down and carries out a next process (S304).

The surrounding terminal management unit 208 performs exception handling (S305). Examples of the exception handling include a notification to the transmission destination selection unit 206 not to use the broken terminal as a packet transfer path, a notification to the base station 100 (used for routing or the like), and a notification to notify an upper layer application of the breakdown state of the terminal.

Next, operation to detect the breakdown (S303) is described by using a concrete example. FIG. 6 illustrates the communication terminal determination recording information D indicating a status in the case where a certain period of time has elapsed and the terminal 105 has broken down after the state of FIG. 5. In FIG. 6, x is in each of items "DETERMINATION" of data of No. 12 and No. 13.

It is assumed that the current time is substantially 00:00:10 on 2014 Jan. 1 after a lapse of one minute from the state of FIG. 6. At this time, the surrounding terminal management unit 208 of the base station 100 examines data relating to the terminal 105 in FIG. 6 (performs determination on data of No. 12 and No. 13).

Subsequently, the surrounding terminal management unit 208 determines that the terminal 105 has broken down since x has been obtained from the results of determination of the data relating to the terminal 105. This breakdown determination is based on a rule of thumb. According to the rule of thumb, sometimes a part of communication links relating to a specific terminal may be cut due to deterioration in the communication environment, but cut of all the communication links does not happen.

Next, operation to detect abnormality (cut) of a communication link (Step S304) is described by using a concrete example.

The surrounding terminal management unit 208 has to confirm that a terminal is not broken down to accurately determine cut of the link. For example, with reference to FIG. 6 as an example, the terminal 105 is not broken down in the case where x is in the item "DETERMINATION" of data of No. 14 in FIG. 6 (because x is not in the item "DETERMINATION" of all the data relating to the terminal 105. Accordingly, the surrounding terminal management unit 208 can estimate that the communication link between the terminals 104 and 105 has been cut.

The above described process can be used not only for determination in the case of the secondary adjacent terminals but also for determination in the case of the adjacent terminals. For example, pieces of data of Nos. 1 to 3 in FIG. 6 are data whose item of adjacency to the terminal 100 is the terminal 101. In the case where x is in the item "DETERMINATION" of data of No. 3 whose item of "ADJACENCY" is the terminal 104, it can be determined that the link between the terminals 101 and 104 has been cut. In the case where x is in the item "DETERMINATION" of data of No. 10 (whose item of "TERMINAL NUMBER" is the terminal 104, and whose item of "ADJACENCY" is the terminal 101), accuracy of the cut of the link improves more (it should be noted that sometimes the cut occurs in only one way of a communication path). In the case where the communication link has been cut, the surrounding terminal management unit 208 performs the above described exception handling (S305) to control the communication path in a manner that the link is not used as the communication path, for example.

(A-3) Effect in Embodiment

The following effects can be achieved in this embodiment.

In this embodiment, HELLO packets to be transmitted periodically by each terminal are transmitted while the HELLO packets include information on surrounding terminals. At the time of reception, the information on surrounding terminals from each surrounding terminal is recorded as the surrounding terminal recording information I. Accordingly, the surrounding terminal management unit 208 can determine breakdowns in the wireless terminals by exchanging information less than the past method.

In addition, the surrounding terminal management unit 208 can determine a reason why a surrounding terminal has left from the communication terminal determination recording information D by distinguishing cut of the communication link from the breakdown of the terminal itself with higher accuracy. This enables larger reduction in erroneous detection of the breakdowns of terminals than the past.

In addition, it is possible to detect breakdowns of terminals from information based on HELLO packets exchanged between respective terminals alone. Therefore, it is possible to avoid bad effect (squeeze into band) to performance in the wireless network 1 due to exchange of wasteful massages for breakdown confirmation performed from the past.

(B) Another Embodiment

The diverse modified embodiments have been described in the above-described embodiments. In addition, the present invention can be applied to a modified embodiment exemplified as follows.

(B-1) In the above embodiment, the terminals 101 to 108 perform predetermined exception handling in Step S305. However, the terminals may transmit breakdown notification signals to the base station 100.

(B-2) In the case of (B-1), many surrounding wireless terminals transmit the breakdown notification signals when a terminal has broken down. However, it is also possible that only a part of the terminals transmits the breakdown notification signals so as to avoid increase in communication traffic in the wireless communication network 1. At this time, various kinds of methods can be used for deciding whether each terminal transmits the breakdown notification signals. An example is described below. Each of the terminals that has detected the broken terminal broadcasts signals including the breakdown notification signals and the HELLO packets after randomly set delay time elapses. Surrounding terminals that have received the HELLO packets including the breakdown notification signals do not transmits the breakdown notification signals. Thereby, it is possible to prevent all the surrounding terminals that have detected a breakdown of a specific terminal from transmitting breakdown notification signals having the same content to the base station 100.

(B-3) The base station 100 that has received the breakdown notification signals can operate as follows. For example, the base station 100 may change a path passing through the terminal determined as the broken terminal to another path, or may transmit no data whose destination is the terminal determined as the broken terminal.

(B-4) The timing when each terminal transmits HELLO packets may be periodic timings, or the HELLO packets may also be transmitted at a timing when the surrounding terminal list of the surrounding terminal recording information I has been updated. This enables quick creation of a secondary adjacent terminal list of the surrounding terminal recording information I.

(B-5) Each terminal may transmit diagnosis packets to the terminal determined as the broken terminal in Step S303 and may confirm the breakdown.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. A wireless communication device that mutually exchanges at least a notification signal including its own identification code and an identification code of a surrounding wireless communication device with the surrounding wireless communication device, the wireless communication device comprising:
   a transmission unit for periodically transmitting the notification signal;
   a reception unit for receiving the notification signal;
   a recording unit for recording and updating surrounding-wireless-communication-device information of each of surrounding wireless communication devices when the reception unit has received the notification signal, the surrounding-wireless-communication-device information including the identification code of the wireless communication device at a transmission side and the identification code of at least one additional surrounding wireless communication device in communication with the wireless communication device at the transmission side that are included in the notification signal; and
   a surrounding-terminal management unit for detecting abnormality of the surrounding wireless communication device from the surrounding-wireless-communication-device information recorded in the recording unit,
   wherein the surrounding-terminal management unit detects the abnormality based on both the identification code of the wireless communication device at the transmission side and the identification code of the at least one additional surrounding wireless communication device.

2. The wireless communication device according to claim 1,
   wherein the surrounding-terminal management unit deletes the surrounding-wireless-communication-device information related to a wireless communication device whose abnormality has been detected among all the surrounding-wireless-communication-device information stored in the recording unit in a case where the surrounding-terminal management unit has detected the abnormality,
   wherein the transmission unit transmits the notification signal that does not include an identification code of the wireless communication device deleted from the surrounding-wireless-communication-device information by the surrounding-terminal management unit.

3. The wireless communication device according to claim 1,
wherein the transmission unit does not transmit the notification signal at the periodic timing, but transmits the notification signal at a timing when the recording unit has updated the surrounding-wireless-communication-device information.

4. The wireless communication device according to claim 1,
wherein the surrounding-terminal management unit extracts all information on a specific wireless communication device from the surrounding-wireless-communication-device information, and when all the extracted information on the specific wireless communication device has not been received within a certain period of time, the surrounding-terminal management unit detects a breakdown of the specific wireless communication device.

5. The wireless communication device according to claim 4,
wherein the surrounding-terminal management unit detects communication link cutting between the specific wireless communication device and a surrounding wireless communication device when a piece of the extracted information on the specific wireless communication device has not been received within a certain period of time.

6. A wireless communication system comprising:
a plurality of wireless communication devices according to claim 1; and
a base station configured to manage the plurality of wireless communication devices,
wherein each of the wireless communication devices further includes an abnormality-notification-signal transmitting unit configured to transmit an abnormality notification signal indicating that abnormality has been detected to the base station in a case where the surrounding-terminal management unit has detected the abnormality of a specific wireless communication device.

7. The wireless communication system according to claim 6,
wherein the abnormality-notification-signal transmitting unit transmits the notification signal including the abnormality notification signal.

8. The wireless communication system according to claim 7,
wherein, when the abnormality notification signal has been received, the base station controls a path to prevent a wireless communication device related to the wireless communication device of which the notification has been issued using the abnormality notification signal, from being passed through.

9. A wireless communication method of a wireless communication device that mutually exchanges at least a notification signal including its own identification code and an identification code of a surrounding wireless communication device with the surrounding wireless communication device,
wherein a transmission unit, a reception unit, a recording unit, and a surrounding-terminal management unit are included,
wherein the transmission unit periodically transmits the notification signal,
wherein the reception unit receives the notification signal,
wherein the recording unit records and updates surrounding-wireless-communication-device information of each of surrounding wireless communication devices when the reception unit has received the notification signal, the surrounding-wireless-communication-device information including the identification code of the wireless communication device at a transmission side and the identification code of at least one additional surrounding wireless communication device in communication with the wireless communication device at the transmission side that are included in the notification signal, and
wherein the surrounding-terminal management unit detects abnormality of the surrounding wireless communication device from the surrounding-wireless-communication-device information recorded in the recording unit, the surrounding-terminal management unit detecting the abnormality based on both the identification code of the wireless communication device at the transmission side and the identification code of the at least one additional surrounding wireless communication device.

* * * * *